United States Patent
Dougherty

[15] 3,700,801
[45] Oct. 24, 1972

[54] IMAGE ANALYSIS AND CORRELATION SYSTEM AND METHOD

[72] Inventor: Charles B. Dougherty, Northridge, Calif.

[73] Assignee: TRW Inc., Redondo Beach, Calif.

[22] Filed: Oct. 3, 1966

[21] Appl. No.: 583,866

[52] U.S. Cl............178/6.8, 178/DIG. 21, 235/181, 250/203 CT, 324/77 G
[51] Int. Cl..............................................H04n 7/00
[58] Field of Search.......178/7.6, DIG. 21; 324/77 G, 324/77 I, 77 J; 179/1 AS; 235/181; 244/3.17; 343/100.7; 250/203 CT; 340/149

[56] References Cited

UNITED STATES PATENTS

| | | | |
|---|---|---|---|
| 3,064,249 | 11/1962 | Forbath | 340/149 |
| 2,820,173 | 1/1958 | Raabe | 235/181 |
| 3,114,859 | 12/1963 | Fathauer | 250/203 CT |
| 3,120,000 | 1/1964 | Wilmotte | 324/77 G |
| 3,120,578 | 2/1964 | Potter | 250/203 CT |
| 3,209,250 | 9/1965 | Burns | 235/181 |
| 3,339,139 | 8/1967 | Lee | 235/181 |
| 3,421,716 | 1/1969 | Altekruse | 244/3.17 |

Primary Examiner—Robert L. Richardson
Assistant Examiner—Joseph A. Orsino, Jr.
Attorney—Daniel T. Anderson, Gerald Singer and A. Valukonis

[57] ABSTRACT

This invention described improved correlation techniques between images by reducing the optical images into electrical signals. Unreliable techniques eliminate variations due to perspective sun angle and optical distortion by using improved techniques for relating the data received from different sources. An improved system and method is described for the analysis of a reference image to an optically-sensed image which performs a Fourier analyses on the electrical signals representing an image. Spatial frequency component amplitudes and/or phases comprising the Fourier frequency components are isolated and quantified for use in a computer.

19 Claims, 26 Drawing Figures

PATENTED OCT 24 1972

Charles B. Dougherty,
INVENTOR.

BY.

*James H. Griffin*

ATTORNEY.

IMAGE ANALYSIS AND CORRELATION SYSTEM AND METHOD

This invention relates to the analysis and representation of optical images using electrical signals; and more particularly the invention discloses new methods and apparatus for the correlation of an image with a stored reference image. The concepts of applicant's invention will be discussed in connection with the general field of optical image correlation and its specific application to the precision guidance of tactical air-to-surface missiles, because that was the particular need that stimulated the development of the concepts of the instant invention. However, the concepts are far broader than the optical-missile-guidance field referred to herein (e.g. star tracking, automatic map compilation from stereo photos, ship navigation by sonar scanning of the ocean floor, photograph sorting and searching, and production line position, shape, or color sensing) and it is not intended that the scope of protection of these concepts should be limited by the specificity of the discussion whereby they are illustrated.

The function of any image correlation system is to orient an optically-sensed image with a reference image or to provide an error signal based upon the relative positions of the two images. For example, one system for automating the correlation of stereo photographs functions by scanning a reference image and an image to be correlated with identical rasters and then processing the output electrical signals derived by the scan to derive an error signal. Hereinafter in this application the output electrical signal produced by scanning an actual image to be correlated will be noted $I_a$; while the reference scan electrical signal will be denoted $I_r$. The processing of these two signals may take many different forms, such as for example, multiplying $I_r$ by a delayed $I_a$ and multiplying $I_a$ by a delayed $I_r$, then differentiating the two throughout one complete frame or raster of the scanning device. Ordinarily, the signal resulting from such processing will have its minimum amplitude when the reference image and the actual image are near coincidence.

In the guidance field, correlation is often performed by projecting the actual image onto a transparency which serves as the reference image, and then sensing maxima and minima of the total light transmission through the transparency. If the transparency is a positive photo of the actual image or "target image" in missile guidance, then the intensity function will reach a maximum when the actual image is close to coincidence with the transparency. On the other hand, if the transparency is a negative of the target image, the intensity transmission function will reach a minimum near coincidence.

In the case of missile guidance, correlation is sought in the terminal phase of missile flight, as the warhead is traveling directly toward its target. Accordingly, the optical sensor has an optical axis or center which the correlation guidance system and the missile controls must bring as close as possible to the "aim point" of the target (and thus of the reference image). Since a correlation guidance system of this type derives its output signal or error signal by maximizing or minimizing some function of $I_a$ and $I_r$, all such systems will be referred herein as "maximum trackers".

The performance of the most advanced maximum trackers heretofore achieved is as follows: an aiming point is selected on the reference image to be tracked, and a center point is selected in the aperture of the optical system for sensing the actual image. A correlation function can then be written in terms of the displacement of the aim point from the optical center and the distance between the aim point and the optical center may be taken to represent the "tracking error" at any instant. A signal that is a function of this tracking error is fed to the guidance controls of a missile or other vehicle in order to alter the course of the vehicle to minimize the tracking error. Prima facie, the maximum tracker approach to correlation guidance seems the most logical; but in practice maximum trackers have often been poor at terminal guidance correlation and have been very limited in performing the acquisition of their targets before entering the terminal phase.

The concepts of the instant invention begin with the observation that many maximum trackers have inherent or necessary disadvantages that make tracking difficult because they attempt to maximize or minimize the entire, raw signals $I_a$ and $I_r$, with little or no processing. Some maximum trackers filter out either high frequencies, or low frequencies, or else pass some band of frequencies to limit the bandwidth in which maximization is performed; but essentially the maximum tracker concept is tied to the almost-unworkable principle of attempting to correlate the amplitude maxima of an electrical signal containing a broad spectrum of frequencies.

The concepts of the instant invention proceed from the Fourier analysis of $I_a$ and $I_r$ and the consideration of each Fourier component by itself in initial phases of the correlation process. The preferred Fourier analysis of a two dimensional reference or the optically sensed image field is by a double Fourier series, rather than the single series commonly used for one dimensional functions. For a detailed discussion of such image analysis, see "A Theory of Scanning and Its Relation to the Characteristics of the Transmitted Signal in Telephotography and Television", by Pierre Mertz and Frank Gray, *Bell System Technical Journal*, Volume 13, pp. 464–515, 1934.

Once $I_a$ and $I_r$ are analyzed in terms of their spatial frequency (double Fourier component) content, it becomes apparent why maximum trackers perform so poorly. Basically, maximum trackers are oriented to the maxima or minima of the correlation function, not to some direct characteristic of the aim point. Though in theory the function maximum should be at the aim point, random statistical variations of various frequency bands will often cause the function maximum to shift from this theoretical point. Such a shift, of course, would introduce spurious tracking error into the guidance and control system. Even worse, as a statistical matter it can be expected that some areas of a reference or optically-sensed image will produce a high proportion of high spatial frequencies, while low frequencies are suppressed; while on the other hand other areas will tend toward the low frequency field components, with high frequencies will be much less in evidence. The overall curve of an $I_a$ or $I_r$ correlation function will take a far different form in each case, yet a maximum tracker must perform some sort of response to both.

Moreover, the correlation function of a maximum tracker appears in a slowly damped oscillating form, with many adjacent maxima and minima. Various maximum tracking systems locate their target maximum by different methods: for example, some trackers differentiate correlation function and use the sign and magnitude of this derivative as an error signal for positioning either the actual or reference image at the location corresponding to the maximum of the correlation functions. Other trackers use first differences between closely separated points to approximate the correlation function derivatives; and another type, such as nutation trackers, obtains the average derivative over displacement interval corresponding to the nutation dimension. The use of derivative-oriented techniques for positioning reference and actual images at the point corresponding to the correlation maximum means that the maximum tracking system can produce a useful error signal only for areas in the reference or optically-sensed images corresponding to spatial frequencies lying between the minima of the correlation function adjacent to the target or aim point. Outside of this adjacent-minima range, the maximum tracker will orient to a spurious maximum and will produce error signals that cause the control system to steer away from the aim point rather than toward it. The result will be a complete loss of track and no simple way of recovering proper course and target acquisition.

Because the variation in frequency content of a maximum tracker correlation signal tends to shift the sensed maximum away from the aim point and in other respects throw the correlation system off track, it is very important to carefully and extensively pre-process reference images used by correlation guidance systems in order to readjust the light intensity of each small segment of the reference image. By so doing, essentially the spatial frequency content of the reference image is altered in such a manner as to compensate for expected distortions in the actual image. Another technique is to perform filtering of the reference image electrical signal or of the optically-sensed image electrical signal, as for example, removing high frequency perturbations. However, such filtering is effective only when it is tailored to a specific image content at a specific aim point; and it is extremely sensitive to other problems to be discussed below.

Perhaps the most important factor in making maximum tracking inherently inaccurate and unreliable is the DC element present in any correlation function. As stated above, a correlation function may be analyzed into its constituent frequencies; in performing such an analysis, a large DC element will inevitably be discovered. While other frequencies, both low and high, will have maxima somewhere near the aim point, the maxima of a DC element will prove to be randomly located. All frequency elements have numerous maxima, only one of which coincides with the aim point, but the overall correlation function will show a central peak near the aim point because of the tendency of one maximum of each frequency element (save for the DC element) to be located very near the aim point, while all the other maxima of each frequency are not likely to coincide.

In many photographs used for reference images, the DC element is very large — often equaling the amplitude of all the other frequencies put together. This has the effect of displacing the central maximum of the correlation function a substantial distance from the aim point. Because a photographic reference image can not assume negative intensity values, complicated techniques in instrumentation are required in correlation function maximization trackers to eliminate the DC element and its adverse effects. Many such trackers, in fact, do not even attempt to suppress the DC element but rely on the use of an increased number of higher frequency elements in order to reduce the tracking error effect of the DC element. However, the potential increase in independent spatial frequency field components is limited by the spatial frequency content of the image spectrum as well as by scale and angular deviations to be discussed hereinafter. Even worse, as the number of frequencies is increased, the distance between the minima adjacent to the aim point maximum is cut down, so that a far narrower angular range of acquisition will be permitted the correlation guidance system. Also, some imagery that the guidance system may be called upon to cope with may not contain usable high spatial frequencies.

Another strongly complicating factor in maximization guidance systems involves the relative scales of the reference and actual images. As a missile is approaching its target, for example, the actual image sensed by the optical system will tend to grow larger, while a photographic or electronically stored reference image would stay the same size unless some compensating system were operating. It has been found that the maximum of a correlation function will shift away from the aim point in almost linear proportion to the rise in scale error. The factor of proportionality is a random variable which takes on different values depending upon the position of the aim point within the image field. The displacement of the correlation function aim point maximum from the actual aim point is primarily a result of phase shift of the constituent frequencies of the function; however, image field component amplitude variations can also contribute to the displacement effect.

Scale variation not only shifts the central maximum away from the aim point, but it also depresses the ratio of the central maximum of the correlation function to various other adjacent maxima. As range error reaches a certain critical point, the central maximum becomes indistinguishable from the various side lobes; so that the guidance capability of a correlation function maximum tracker completely disappears.

The inutility of maximization trackers due to scale variation has been explained in detail. Without a similarly elaborate explanation, it should be pointed out that equally bad performance deterioration results because of a variation in the course of the missile from the heading and slant anticipated in preparing the reference image. Similarly, pitch, roll, or yaw angular variations in the missile itself, regardless of whether it is flying the right path or not, will shift the sensor optical axis so badly that it may well be unable to perform acquisition altogether. Even if the optical system is within acquisition range, however, errors in slant, pitch, roll, and yaw may induce such large spatial frequency phase errors that the tracker will be completely thrown off or will perform with unacceptably large errors. Other problems with maximization trackers include the ranging problem where high hills or buildings are concerned. The difference between the top of such obstructions and the bottom may represent 10% of the distance between the missile and the target as the terminal phase is completed: yet it is very difficult to develop a ranging system that would perform its measurements exclusively from either the top or the bottom without varying between the two depending on orientation. Maximum trackers have also proved very sensitive to the time of day and the season at which an approach to target is made relative to the time of day and season for which the reconnaissance for the reference photographs was originally performed. Since it is difficult to predict in advance the date and time of day when a specific missile is to perform its correlation guidance tracking, this last sensitivity of the maximum tracker would require the insertion in the field or at the last minute of specially prepared reference photographs, although field access to missile guidance systems is an extremely undesirable necessity.

It is a general object of the instant invention, therefore, to provide improved correlation between images; and more particularly the invention seeks to improve the accuracy and flexibility of correlation tracking using reference and optically-sensed images for missile, aircraft, and spacecraft guidance. More particular objects of the invention are the development of a more reliable system of analysis for relating two blocks of data and the development of a system for orienting one image or block of data to another image based on the maximization or minimization of various analytical points derived therefrom. Another object is to perform correlation guidance that is considerably less sensitive to variations in perspective, sun angle, optical distortion, or other such disturbances that are apt to occur.

In the achievement of the above and other objects and as a feature of the instant invention, there is provided a system for the analysis of images and the relation of a reference image to an optically-sensed image (or to another reference image) which functions by performing Fourier analyses or some other comparable breakdown of electrical signals representing the image to be analyzed into their constituent parts, preferably their Fourier spatial frequency components. Following this analysis, spatial frequency component amplitudes or phases are isolated and quantified in such form that they can be used for computing.

As another feature of applicant's invention, rather than perform identification or correlation of images by analyzing the amplitude either of the overall correlation function or of various spatial frequencies thereof, the instant invention identifies and correlates by analyzing phase and phase difference of each separate spatial frequency isolated from a reference image or an optically-sensed image. Once this is done, the degree of commonality of two blocks of data (or the identification of any such block) may be established by the formation of a set of phase differences, each member of the set being the difference of the phase angles of corresponding harmonic components from each data block or from a reference block and a data block.

Another feature of the instant invention is the maximization of the commonality of two data sources, such as a reference image and an optically-sensed image, by minimizing the set of phase differences of the Fourier spatial frequency components of each such image. Preferably, this may be accomplished by the translation of one block of data along the direction of the common independent variables, repeating the Fourier analysis on the translated data to yield a new set of phase differences, the process of translation being repeated until the phase differences reach a minimum. Another feature of the instant invention is the means for automatically determining the direction of translation that will produce the above-mentioned minimum in the phase differences.

Another feature of the instant invention is the system of concepts developed for selecting the harmonic frequencies to be used in the phase analysis of an image. If a reference image and an optically-sensed image are to be correlated, for example, they will be scanned using scan rasters that are identical in appearance and timing. The starting point for Fourier analysis will then be to set the fundamental of the Fourier series as either the frequency of scan or some multiple thereof. The highest frequency to be used is preferably taken as about one half of the translation to be made in the optically-sensed image to arrive at correlation, this translation being expressed in frequency units or wavelengths. This limitation of the highest frequency for phase-difference analysis serves to minimize errors due to variations in perspective, sun angle, and optical distortion.

Somewhat along the same line, if one of the data blocks to be analyzed and/or correlated is a fixed reference, such as a photograph or electronic storage means for photographic material, the invention provides methods of preprocessing the fixed reference by filtering and the like so as to remove those harmonics which could result in confusion as to the identity or correlation of images, due to the phenomenon of phase anomaly. This feature of the invention results in a great increase in the tolerance of an identification or correlation system to errors in magnification and errors due to change in spacecraft attitude, perspective, or optics. The invention also provides important additions to the present state of the art as far as methods of pre-extracting phase data from a reference block and the storage of such phase data in electronic or other convenient form is concerned.

By contrast with prior art correlation function trackers, the phase tracker according to the principles of this invention determines image coincidence by a process which does not inherently involve tracking error and is therefore able to provide the necessary guidance information using a much smaller quantity of spatial frequency data. Furthermore, the spatial frequency data can be extracted from the lower portion of the image spatial frequency spectrum, so that the tracker capture range is not compromised at the expense of tracker accuracy. As a further result of using low frequencies, the tracker has maximum tolerance to range, pitch, yaw, and roll perturbations, thus minimizing requirements placed on supporting inertial elements. The selective use of minimum spatial frequency data also reduces the amount of image information which must be gathered by the tracker sensor and, even more importantly, reduces the reference data requirement to a level where it can easily be met by digital storage rather than by the storage of photographic replicas of the target as is required by correlation function maximization trackers. Digital storage provides the operational advantages of virtually instantaneous retargeting capability and the avoidance of physical access to the tracking system in the field. Additionally, it appears that the minimal digital storage required with phase tracking will be less expensive in terms of guidance equipment than the photography stores associated with correlation function trackers, particularly in view of the difficult technical requirements for rapid sequencing and precision positioning placed on photographic storage systems.

Another feature of the invention is the location of points on an image which has been analyzed in terms of its Fourier spatial frequency components by the use of constant phase contours for each Fourier component. These constant phase contours are lines along which the phase of any one certain Fourier component is the same; or, in other words, the contours are everywhere perpendicular to the phase-shift gradient for that frequency of component. Such a contour follows an approximately straight path, but is wavy rather than perfectly straight, because of the randomness of the image. Every Fourier spatial frequency component has a field of such phase contours, nearly parallel to one another in general direction and spaced approximately one wavelength apart. Since all such contours appear the same from a strict phase-analysis standpoint, image point identification is valid only within the range between phase contours adjacent to the point, called the "capture interval". Outside this capture interval, phase-analysis of one Fourier spatial frequency component alone would give no indication that the phase sensed was separated from the sensor optical axis or from the aim point (whichever is selected as the zero phase reference by a distance of $\pi$ radians + the phase sensed.

When three Fourier spatial frequencies (or the like) are analyzed in an image, three simultaneous equations can be solved by an in-flight or link-relay computer to give not only the X and Y coordinates of the sensor optical axis or aim point or some other reference point, but also the slant range of the sensor from the image. This slant range is useful because the phase parameters of any given point on an image change with change in slant and/or distance. However, due to the small number of measurements and computations required by the inventive Fourier spatial frequency phase analysis method, it is relatively easy to store sets of parameters appropriate to various slant range values and shift (electronically) from set to set as the slant range measurement dictates. In missile guidance terms, this means that as a missile using a phase tracking system approaches its target, it would compute with a new set of components as the slant range narrows. It should be noted that prior art tracking systems often cannot handily switch or correct tracking parameters in the short terminal flight period with sufficient speed to ensure accurate computing. For example, it is impossible to shift a reference scan from one photograph to another in a few microseconds.

As another feature of the invention, the frequencies of the Fourier components to be phase-analyzed in image analysis or correlation tracking are selected according to several unique criteria, explained in the more detailed explanation to follow. In general, however, component frequencies are first based on optical aperture and/or on optical-electrical transducer scan frequency and, secondly, are kept as low as possible.

When a guidance system using applicant's Fourier component phase analysis principles is in its tracking mode, it must have its optical axis (i.e. the above-mentioned axis of its optical sensor) within about 2.5° of the aim point for a 10° total field of view, (i.e. within a 2.5° "tracking cone"). Since missile guidance systems, where low cost inertial components must be used, provide a low probability that the missile will enter the terminal or tracking phase within its 2.5° cone, another important feature of applicant's invention relates to the target acquisition potentialities of phase analysis correlators.

Acquisition is accomplished by identifying the constant-phase contours that pass through or near the optical axis point (i.e. the point where the optical axis of the tracker optical sensor intersects the image being sensed) and storing a set of phase values corresponding to all the possible contour intersection points. The missile or communication-linked computer then searches through the stored sets to find sets of phase values corresponding most closely to the phase values signaled by the optical sensor and its associated Fourier component phase extraction electronics. Once the actual phase contours are matched with a specific stored set, the location of the optical axis relative to the aim point can be computed, and acquisition can begin by supplying appropriate signals to the missile guidance servosystem and/or to the optical sensor servosystem.

The phase information to be stored to serve as an acquisition reference is obtained by reconnaisance photography as is presently done, but far less processing of the photographs is needed by phase trackers. Information may preferably be electronically stored in the form of sets of phase values relating to discreet grid points covering the target environs. The grid points should be extensive enough that a missile midphase guidance system (presently inertial) will be sure to get the optical sensor axis within the grid point area. Additionally, the grid points must be near enough to one another or of sufficient density that the tracker computer can recognize which grid points are nearest the optical sensor axis and interpolate therebetween, since there is only random probability that the optical sensor would commence operation with its axis directly intersecting one of the stored phase set grid points. Another feature of the invention is a collection of principles whereby grid point location and the number of bits to be stored in each phase set can be determined.

An attempt to perform similar acquisition with a prior-art maximum tracker system resulted in the function maximum appearing on the opposite side of the grid from the optical axis three times more field components would have to be stored at each grid point and the grid point density would have to be three times as great, requiring in all nine times the data used by the phase tracker, to obtain equivalent acquisition performance using the correlation function maximum.

Applicant's experience in the practice of the above inventive concepts is that phase behavior with respect to aperture displacement, both without and with perturbations from aspect, scale, and roll errors, is quite consistent with predictions based on general statistical considerations. There are, however, some differences indicated by the experimental studies. Fairly large regions exist for specific spatial frequency components in which phase errors tend to be smaller than assumptions based on perfectly random imagery would predict. This seems to be especially true of phase shifts due to roll errors. Moreover, these regions show internal systematic trends which are undoubtedly associated with the nature of the image content but which are not obviously predictable analytically. On the other hand, spatial frequency amplitudes tend to show no regular relationship to aperture displacements except for broad trends associated with marked changes in the nature of the imagery.

Phase behavior of any given component is most useful for tracking in the direction normal to the wavefronts, i.e., essentially normal to the contour lines. This is of course completely predictable and fairly obvious; it is, however, fundamental to phase tracker implementation. Therefore sets of frequencies to be used for tracking applications should be chosen with wave normals directed at as large angles to one another as possible.

Anomalous phase behavior is observed perhaps 10 percent of the time. In regions where this occurs for a particular spatial frequency component, phase tracking depending strongly on that frequency would suffer severely degraded performance. However, these regions are characterized by very low values of the component amplitudes, so they can be easily recognized or predicted. Also there seems to be very little correlation between spatial frequencies with regard to this behavior, so suitable frequencies for reliable tracker performance can always be found for any region.

Spatial frequencies in the range $(m^2 + n^2)^{1/2} = 2$ to about $(m^2 + n^2)^{1/2} = N/2$ seem to exhibit the most satisfactory characteristics for tracking purposes in general. However, the lower frequencies [$(m,n) = (1,0)$, $(m,n) = (0,1)$ and $(m,n) = (1,1)$] are in many selected cases very well behaved, and can be used if other considerations indicate that this is desirable. Frequencies at the higher end of the range suffer from very small acquisition intervals, so better limits on optimum frequencies might be more like 2 to $N/4$.

Other objects and features of this invention and a fuller understanding thereof may be had by referring to the following description and claims taken in conjunction with the accompanying drawings in which:

Figure 1:
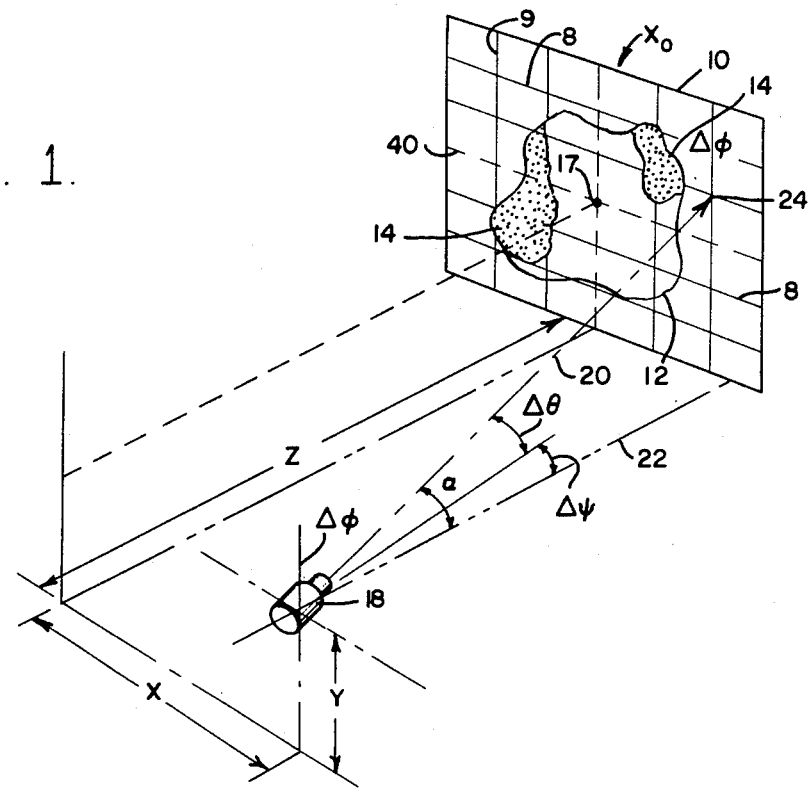
FIG. 1 is a schematic diagram of a tracking system wherein the principles of the instant invention might be practiced.

Referring to FIG. 1, the preferred embodiment of the principles of the instant invention shown therein may be used for analyzing images appearing in a plane 10. In order to specify location on the plane 10, orthogonal reference lines 8 and 9 are applied thereto, preferably in the horizontal and vertical directions. The zero reference line in the horizontal direction is labeled $X_o$ on the plane 10; while the zero reference line in the vertical direction is labeled $Y_o$. The point where these lines intersect would have the coordinates (0,0). An image 12 appears in the image plane and has dark portions 14 and light portions 16. In practice, images analyzed by the system of the instant invention may have all different types of shading and often are actual landscapes, buildings, and the like, rather than being perfectly planar.

Located some distance from the plane 10 is a sensor 18, also referred to herein as an optical-electrical transducer, optical sensor, or similar terms implying that the sensing unit 18 produces an electrical signal representative of radiation received from the image 10. A typical sensor that could be used in the position 18 would be a vidicon television camera.

The sensing unit 18 has a location and an attitude, both of which may change while the sensor is in operation. Thus, it is important to sense location and attitude relative to the image plane 10 and in particular, relative to the coordinates $X_o$ and $Y_o$ of the image plane 10. For this purpose a coordinate $Z_o$ perpendicular to both $X_o$ and $Y_o$ is defined. $Z_o$ extends, of course, perpendicular to the plane 10 also, and serves as a measure of the distance of the sensing unit 18 from the plane 10. Accurate location of the sensing unit 18 is completed by projecting the coordinates $X_o$ and $Y_o$ upon a plane parallel to the image plane 10 in which the sensing unit 18 is located. Accordingly, the exact location of the sensing unit 18 relative to the (0,0,0) point in the image plane 10 (numbered 17) can be expressed by giving the $(x,y,z)$ coordinates of the sensing unit 18.

The $x$, $y$, $z$ coordinates give the location of the sensing unit 18 at any time, but the attitude of the sensing unit is measured in a somewhat different matter for image analysis purposes. First, a reference line 20 is defined for the sensing unit 18. It is most convenient and appropriate to use the optical axis of the sensor 18 as the reference line, since the optical axis represents the center of whatever image the sensor 18 is viewing at a certain moment. Accordingly, the reference line 20 will be referred to herein as the optical axis, but it should be understood that other reference lines could be suggested: for example, lines from any corner of the sensor aperture, or some point along the bottom or top of the sensor aperture.

Whatever attitude the sensor 18 assumes, its optical axis 20 will make some angle $\alpha$ with a line 22 which is perpendicular to the image plane 10 and passes through the location point of the sensor 18. Preferably, this location point would be one which the optical axis 20 passes through and which the sensor 18 rotates about in its pitch and yaw directions. For electrical sensing and computation, the angle $\alpha$ is broken up into its components in the $x$, $y$, and $z$ planes, herein denoted $\Delta\phi$, $\Delta\theta$, and $\Delta\psi$. Once the $x$, $y$, and $z$ coordinates (i.e. location) and the $\Delta\phi$, $\Delta\theta$, and $\Delta\psi$ coordinates (i.e. attitude or orientation) of the sensing unit 18 are known, the point where the optical axis 20 intersects the plane 10 can be calculated. This point has been numbered 24 in FIG. 1 and is usually referred to herein as the optical axis point, or some other term indicating that the sensor 18 is pointed at that particular point 24 at a certain moment in time.

Although FIG. 1 is intended to give the basic situation in which image analysis, guidance tracking, and many other functions for which the system to be disclosed herein might be useful are performed, in practice the situation might look entirely different. For example, the sensing unit 18 might be a star tracker in a space vehicle, so that the plane 10 and planar image 12 would be replaced by three dimensional universe many light years in depth. The sensing unit 18 might also be used for automatic map compilation, using stereo photographs to compute and print out a contour chart or map. In that situation, there would be two planes 10 and two sensing units 18, and the electrical location and orientation signals of the two sensing units when pointing at an identical location point 24, their respective photographs would be the raw material for the computer to use in calculating and printing the contour chart.

In submarine and ship navigation, two sensors 18 could be used, one to scan the bottom of the ocean while the other scanned a reference photograph or map. Likewise, in photograph sorting and searching, two sensors 18 might be used, or one sensor 18 might scan or sort actual photographs appearing in the position of the plane 10, while the reference signals for producing, sorting, or searching commands would be supplied from an electronic memory rather than from identical scans of a reference image. This electronically-stored reference concept would apply even better using the system of FIG. 1 for production line quality control or other automation; for the system to be described in detail hereinafter is able to sense not only the mere presence or the color of an object but also its exact position and indeed its exact measurements. The importance of such a capability not only for guidance and navigation, but also for production line control or other monitoring functions should be obvious to those working in the automation field.

The (0,0,0) point 17 of the image plane 10 is an important reference in the system of FIG. 1. It will usually be referred to herein as the aim point, target point, reference point, or zero-reference. It has been most convenient to express the location of any point 24 in the form of a vector 26 originating at the reference point 17. For example, in missile guidance work, where the sensing and computing equipment is preferably as simple and inexpensive as possible, the zero-reference point 17 is commonly taken as the point or location on a reconnaisance photograph of the missile target where it is desired to aim the missile. In the terminal guidance of the missile, where the missile sensor 18 is mounted fixed within the missile, the vector 26 between the missile target point and the momentary point 24 is the most convenient measure of the error in the terminal flight path.

Once having derived an electrical signal representative of the vector 26, whether in $x$, $y$ coordinates or in terms of an angle and distance, it is a simple matter to derive control signals for the missile's flight control surface servo mechanisms which will tend to reduce the error vector 26 to zero. Depending upon the type of image analysis that is being performed by a system of the sort illustrated schematically in FIG. 1, the vector 26 may be an error vector or a location vector. In any case, it indicates the distance of the reference line 20 from some reference point 17.

Figure 2:
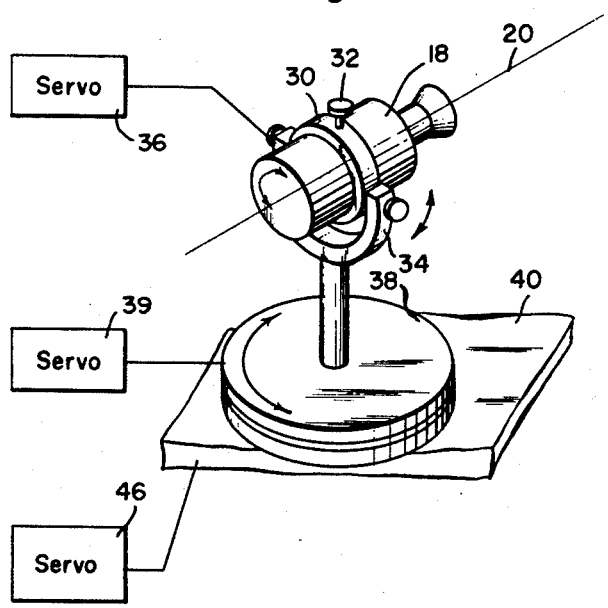
FIG. 2 is a perspective view in detail of the optical-electrical transducer in FIG. 1.

It would be a rare practical application of the system of FIG. 1 where the sensor 18 would be found with freedom to move or servo mechanical capability of moving in all three directions of translation ($x$, $y$, and $z$) and also in all three directions of rotation (yar, pitch, and roll). In fact, in production line work a sensing unit would ordinarily be perfectly stationary while the image 12 would move. However, for laboratory purposes and for purposes for explanation herein it is desired to endow the sensing unit 18 with freedom of translation in all three directions $x$, $y$, and $z$ and, also, freedom to roll, pitch, and yaw. Accordingly, in FIG. 2 there is illustrated a vidicon camera 18 rotatably mounted within a ring 30. A set screw 32 in the ring 30 serves to hold the camera 18 in place at a certain exact angle of rotation. Ordinarily, the ring 30 would be calibrated exactly so that the rotation of the camera 18 could be read out in the laboratory. The experimental purpose for providing roll capability by mounting the camera 18 in the ring 30 is to determine the effect of various degrees of roll error in the tracking capabilities of the system of FIG. 1. Since this roll error would be changed only when a new testing angle was desired, the laboratory set-up would rarely have a servoed roll capability. On the other hand, a camera mounted in a missile warhead would undoubtedly be under the influence of missile servo signals which would seek to reduce roll error as much as possible.

The camera 18 rotates about an axis perpendicular to its optical axis 20 by having the ring 30 mounted on gimbals 34. In laboratory tracking and guidance experiments, the gimbals 34 would ordinarily be strictly controlled by a servo mechanism, represented at 36. As with all representations of servo mechanisms herein, the unit 36 is assumed not only to impart a controlling force in response to an electrical signal indicating the exact orientation of the element that it controls. Thus, the servo mechanism 36 would in effect monitor the elevation of the camera 18, denoting as $\Delta\phi$ in FIG. 1.

The gimbals 34 ride on a turntable 38, which is made to rotate by a servo mechanism-position sensor 39. The position sensor 39 would produce the electrical signals indicative of $\Delta\psi$ in FIG. 1.

The table 38 rides on a table 40 which would preferably maintain a separate orientation to the plane 10: the most appropriate orientation would, of course, be with the base 40 parallel to the $x$ and $z$ axes and perpendicular to the $y$ axis. It can be seen that the mounting of the camera on the base 40 is made with sufficient degrees of freedom to allow the optical axis 20 to traverse a full semi-sphere. In addition, the base 40 should be mechanized and servoed (represented at 46) to provide for three degrees of translation of the camera 18. The single servo mechanism-position sensor 46 is represented as controlling and monitoring the translation in $x$, $y$, and $z$ directions of the base table 40, although often even in laboratory work the only direction of translation that is necessary is that along the $x$ axis.

Figure 3:
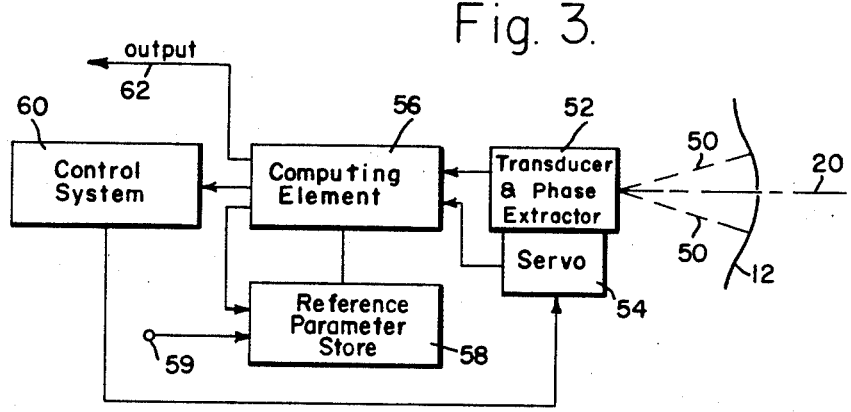
FIG. 3 is a block diagram of the electronics associated with the system of FIG. 1.
Figure 7A:
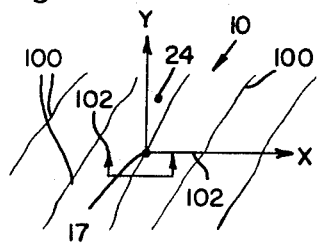
FIGS. 7a, 7b, 7c and 7d illustrate the location of points on an image in terms of the constant phase contours of Fourier intensity components of said image.
Figure 7B:
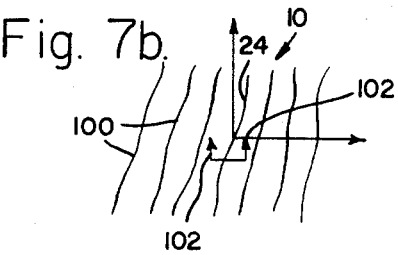

The camera 18 of FIG. 1 is the initial link in an electrical circuit which is represented in block form in FIG. 3. The camera transduces radiation 50 from the image 12 into electrical signals. The camera 18 is part of a general transducer and phase extractor system 52 which according to the teachings of this invention performs the functions of first turning the radiation 50 into electrical signals, then performing a Fourier analysis of the electrical signals, and finally producing electrical signals representative of the phase of a number of the Fourier components analyzed. The overall effect of the transducer and phase extractor system 52 is, therefore, to produce electrical signals representative of the phase of certain points on the image 12. How this overall function is performed is not central to the principles of the invention, and as the discussion to follow will show, there are some methods of doing it that are not even totally electronic.

A block 54 represents the combined servo mechanisms and their associated position sensor, which also provide signals relative to the location and orientation of components of the transducer and phase extractor system 52. As will be shown below, in specific cases no position or orientation signals are needed other than the signals produced at 52; for the analysis concepts of the instant invention make it possible to compute both orientation and distance of the sensor 18 from the image 12 using only the sensed phase derived from the radiation 50. The exact nature of this phase concept will be explained in greater detail hereinafter.

Phase information from 52 and, in some cases, location and attitude information from 54 are fed as inputs into a computer 56 which also receives signals from a parameter store 58. The parameter store 58 contains reference values of phase by which any point 24 can be recognized. The computing element 56 searches the information in the reference parameter store 58 to find a set of stored reference values that correspond to the actual phase values derived from the incoming radiation 50. Ordinarily the set of stored reference phase values will also have identification information attached to it, so that when a certain set of stored reference phase values is selected by the computer 56 as being identical or most nearly identical to the phase of the incoming radiation 50, the coordinates of the point 24 will be sensed by the computer 56.

Along with the coordinates of the point 24 the parameter store 58 may also associate with each set of reference phases one or two other items of information that are important to the system of FIG. 1 in various applications. For example, in missile terminal guidance a warhead is closing on a target at very rapid speed. As the distance from the missile sensor 18 varies (from a number of miles down to a thousand or less feet), the phase of various Fourier components derived from a given point 24 will change. Therefore, it is necessary to store in the reference parameter store 58 phase values for each point on a target image at each of a number of distances between sensing unit and target. The computer 56 will then derive not only the coordinates of the point 24 but also an indication of distance from the point 24; so that it can periodically switch the reference parameter store 58 from one set of parameters to another as the missile closes on the target. Similarly, in some situations the angle of the sensing unit from each point 24 might well vary so greatly that the phase values sensed from the point 24 will need to be switched. In such a situation the computer 56 would switch the parameter store 58 as a function of variation of the angle or its components.

The terminal 59 has also been shown as supplying an input to the parameter store 58. This terminal 59 might be used for several functions. In missile guidance, navigation, or automation, it might serve to change the results of the computation 56 in order to orient to new locations or to perform new functions. This might be done either by switching the parameter store 58 from one set of already stored parameters to another, or it could be done by erasing the old parameters and feeding in new parameters at 59.

The computer 56 might also supply another set of output signals to a control system 60, which uses the output signals to produce control signals for the servo system 54. In missile guidance, the entire purpose of the system represented in FIG. 3 is to derive the control signals for the servo mechanism 54. On the other hand, the computing element 56 may well derive a set of electrical signals for an output signal line 62 for telemetry, recording, contour mapping, or numerous other purposes for which image analysis might be used.

The principles of the instant invention relate to the analysis of the electrical signal produced by the camera 18. In order for image correlation or other such operations to be performed, the image data must be in an analytical form. "Theory of Scanning and Its Relation to the Characteristics of the Transmitted Signal in Telephotography and Television", by Pierre Mertz and Frank Gray, *Bell System Tech Journal*, Vol. 13, 1934, pp. 464–515, discusses in great detail the use of Fourier series and more particularly of Fourier spatial frequency series, for the analysis of image signals. A two-dimensional image intensity function $I(x,y)$ can be represented within a rectangular aperture of dimensions $2a$ and $2b$ by the following formula:

$$I(x, y) = \sum_{m=1}^{\infty} \sum_{n=-\infty}^{\infty} I_{mn} \cos\left[q\left(\frac{mx}{a}+\frac{ny}{b}\right)+\Phi_{mn}\right]$$

$$+\sum_{n=0}^{\infty} I_{on} \cos\left[\frac{q\,ny}{b}+\Phi_{on}\right]$$

In the above formula, which will be referred to herein as the Fourier spatial frequency formula, $I(x,y)$ is a representation of the intensity of light or of the electrical signal produced by the camera 18 as a function of the $x$ and $y$ coordinates of the point 24 of FIG. 1. $I(x,y)$ is, therefore, dependent upon the characteristics of the image 12 on the plane 10. In the right hand side of the equation the $I$ terms, particularly $I_{mn}$, are the coefficients of amplitude of the intensity; while the $\Phi$ terms, particularly $\Phi_{mn}$ are the expressions of phase relationship, herein called merely "phase", of the intensity function.

If a certain value is assigned to m and a certain value is assigned to $n$, and then $I(x,y)$ is evaluated for a number of points $x,y$, the evaluation of $I(x,y)$ will be made for one Fourier component (identified by its $m,n$ values) of the total series, or in the case of a two dimensional function like $I(x,y)$, the analysis will be referred to one Fourier spatial frequency component. Any single Fourier spatial field component evaluated in $x$ and $y$ produces a sinusoidal variation of intensity extending across the aperture of the optical electrical transducer.

Figure 4A:
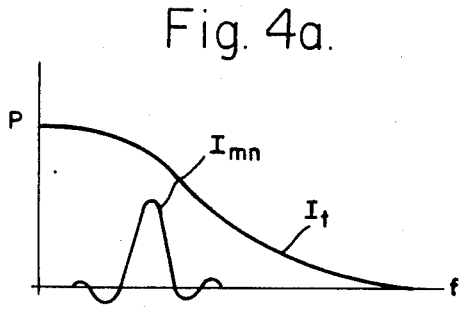
FIGS. 4a and 4b show graphs of frequency versus power and displacement versus power, to analyze the power content of an electrical signal produced by the optical-electrical transducer of FIG. 1.
Figure 4B:
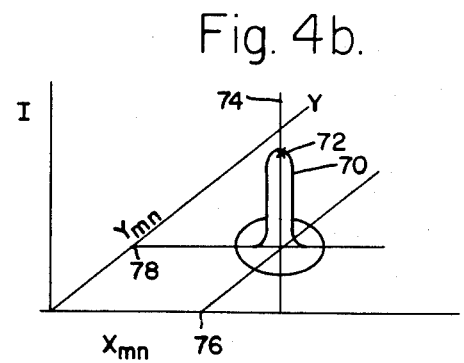

Referring to FIG. 4a, the function graphed there is the power content $I(x,y)$ at each frequency from 0 to ∞. By Fourier theory, of course, $I(x,y)$ evaluated at any point is made up of an infinite series of different frequencies, each of which supplies a portion of the total power of the light intensity $I$. Each point on the curve represents the total power at any given frequency; and the total area under the curve represents the total power of $I(x,y)$. The curve $I(m,n)$ represents the contribution of intensity or electrical signal power of a given Fourier spatial frequency component (defined by assigning an exact value to $m$ and $n$ in the function $I(x,y)$ when the function $I(x,y)$ is evaluated at a certain point $(x,y)$. As shown in FIG. 4b, any given Fourier spatial frequency $I(m,n)$ is not a mere plane curve, but is a two-dimensional figure as shown at 70. This two-dimensional figure has a maximum at 72 and has a location measured by the intersection of a line 74 passing through the maximum 72 and constructed perpendicular to the $x,y$ plane. The component 70 has a location in the $x,y$ plane denoted in the usual fashion by the coordinates at 76 and 78. The two parameters that are utilized in the Fourier analysis of electrical image signals are the location of each Fourier component 70 (phase) and the height 72 thereof (amplitude).

Figure 5A:
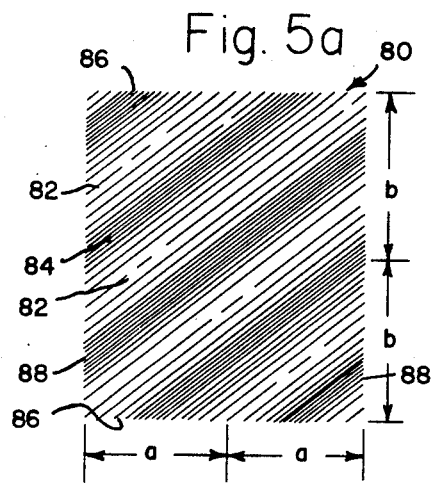
FIGS. 5a, 5b, 5c and 5d are a representation of the variation of light intensity across an aperture, depending upon the values of the Fourier analysis intensity equation discussed herein.

FIGS. 5a through d set forth in detail four Fourier spatial frequency components, with variations of intensity represented by variations in line density for several index combinations, i.e. several exact values of $m$ and $n$. Each component a through d is represented in terms of its aperture, which has dimensions 2a by 2b. The Fourier spatial frequency component of $I(x,y)$ portrayed in FIG. 5a has the index combination (+2, −3), which is to say that it is the Fourier spatial frequency component of $I(x,y)$ where $m=+2$ and $m=-3$. All the intensity-representing lines 80 running across the aperture of FIG. 5a are parallel to each other; as is true for any Fourier spatial frequency component. The spacing of the lines relative to one another define low intensity area 82, where the intensity of the $m,n$ component of $I(x,y)$ does not have a very high value, and high intensity areas 84, where the $m,n$ component of $I(x,y)$ takes on a high value. These high-intensity and low-intensity areas alternate in a sinusoidal relationship.

All the lines 80, being parallel, take on a certain slope relative to the horizontal coordinates 86 and the vertical coordinates 88, i. e. the $x$ and $y$ coordinates or the sides of the aperture of FIG. 5a. The slope of all these lines 80 relative to these components can be defined as the angle $\Psi(m,n)$ by which the wavecrests of the field component are tilted away from the horizontal axis. $\Psi(m,n)$ is best defined in terms of its tangent: $\tan \Psi = mb/na$. In terms of this formula it can be seen that field components with $m=0$ have their wavecrests parallel to the $x$ axis; while components with $n=0$ have their crest parallel to the $y$ axis. The wavelength $\Lambda$ of a field component may be calculated by the distance between crests: $2ab/[(na)^2+(mb)^2]^{1/2}$. Spatial frequency $F_{mn}$ of a component is a reciprocal of the wavelength and is given by the formula:
$$F_{mn} = \sqrt{(m^2/2a)+(n^2/2b)}.$$

Figure 5B:
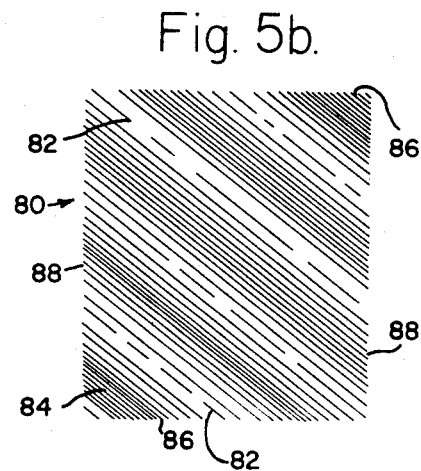
Figure 5C:
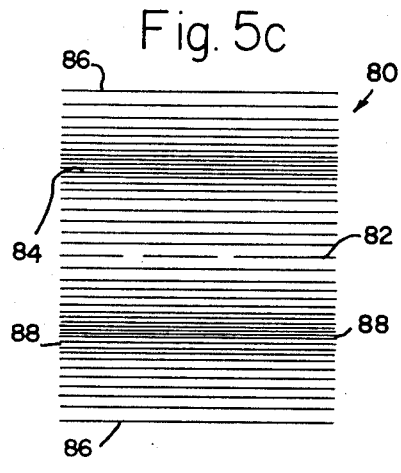

As examples of other components possible using very low values of $m$ and $n$, FIG. 5b shows the (+2 +3) component of $I(x,y)$. FIG. 5c illustrates the effect of making $m$ equal to zero: the lines 80 are then parallel to the $x$ axis 86, and the variations of intensity of the FIG. 5c Fourier spatial frequency component, or more properly, the (0,2) component, occur in a direction perpendicular to the $x$ axis 86. Another way of expressing this relation is that a constant-intensity contour of the (0,2) component would be parallel to the $x$ axis 86.

Figure 5D:
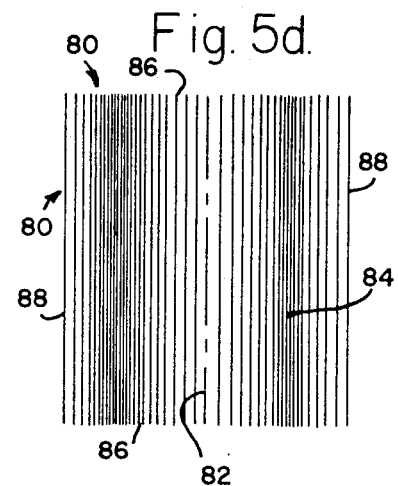

The component shown in FIG. 5d has exactly the opposite relationship from that shown in FIG. 5c. It is the (2,0) component, and all its lines 80 are parallel to the $y$ axis 88. Its variations of intensity occur in a direction parallel to the $x$ axis 86, and its constant-intensity contours are perpendicular to the $x$ axis 86.

The component shown in FIG. 5d has exactly the opposite relationship from that shown in FIG. 5c. It is the (2,0) component, and all its lines 80 are parallel to the (2,0) component, and all its lines 80 are parallel to the $y$ axis 88. Its variations of intensity occur in a direction parallel to the $x$ axis 86, and its constant-intensity contours are perpendicular to the $x$ axis 86.

Figure 6:
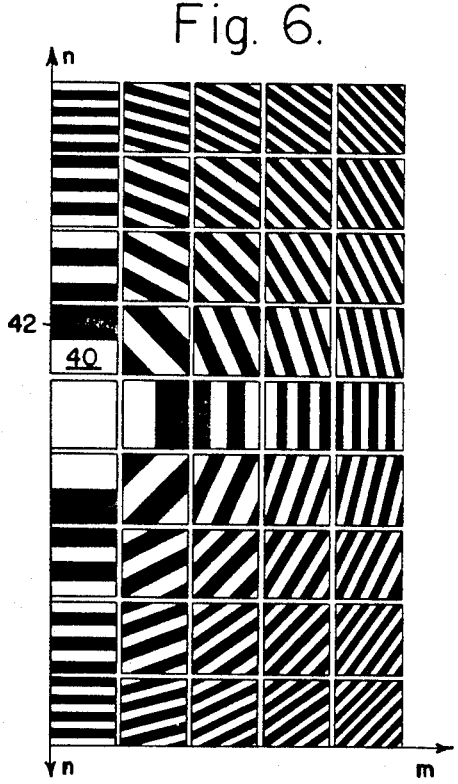
FIG. 6 is an array of intensity-variation components of the sort shown in more detail in FIG. 5.

FIG. 6 sets forth an array of Fourier spatial frequency components of $I(x,y)$ where intensity is represented not by the more fine method of shading with the line 80 but rather by alternate light and dark areas 90 and 92, respectively. The array is framed in terms of coordinates of m running from $m=0$ to $m=4$ and coordinates of n running from $n=-4$ to $n=+4$. The Fourier theory, of course, contemplates an infinite number of components of $m$ and $n$; however, the small number of components in the array of FIG. 6 are enough, and indeed more than enough, to perform all the Fourier analyses according to the principles of the instant invention that are required for excellent image analysis and correlation.

FIGS. 4 and 5 illustrated the mathematical nature of the Fourier spatial frequencies extracted by the transducer and phase extracter system 52 illustrated in FIG. 3. It should be noted that one-dimensional Fourier analysis could easily be used to analyze images such as that shown at 12 of FIG. 1. Since the usual scan of an optical-electrical transducer is along a linear raster, Fourier analysis can be performed as though there were no intensity variation in the y direction. Moreover, the principles of the invention would apply to analysis of the electrical signal transduced at 18 whereby the electrical signal was analyzed into constituent components other than the Fourier series components discussed herein. However, when Fourier analysis is performed, the function $I(x,y)$ given above for each of the constituent components (i.e. each separate set of $[m,n]$) has two easily-discernable values: amplitude or $I$ max, and phase or $\Phi_{mn}(x,y)$. As was stated in the introduction, the unsatisfactory performance of prior art correlation trackers was attributable to the fact that they sought to perform guidance by minimizing the entire intensity function, $I(x,y)$. Especially because of the wide and random DC variations of $I(x,y)$, this is a most unreliable technique.

On the other hand, the variation of any one Fourier component phase, $\Phi_{mn}(x,y)$, proves to be highly reliable. Guidance using Fourier analysis and amplitude sensing of Fourier components might well be referred to as amplitude tracking; while guidance using Fourier analysis of the optical-electrical output signal and phase sensing of the Fourier components is referred to herein as phase tracking. Because of its reliable and easy implementation, applicant prefers phase tracking for guidance purposes, and the detailed discussion herein is framed in terms of this preferred practice.

Referring to FIG. 7, the representations of the point 17 on the plane 10 shown in parts $a$ through $d$ therein is made relative to a series of curves 100 which will be referred to hereinafter as "constant phase contours". By this it is meant that each curve 100 represents a plot of a certain value of phase for a certain selected Fourier spatial frequency component across the plane 10. Each of the roughly parallel lines 100 is a plot of the same phase value, but shifted by $2\pi$ radians. Since all phase values are essentially a measurement of phase shift from some zero reference, the aim point 17 in any reference image will always be used to locate one zero-phase contour of each Fourier spatial frequency component. For this reason the aim point 17 will be referred to in phase terms as $\Phi_{mn}(0,0)$.

Two arrows 102 in FIG. 7 $a$ and 7 $b$ are spaced approximately one half a wavelength either side of the target point 17. The interval between these arrows is known as the "capture interval", so called because a system performing tracking by analyzing only one Fourier component would orient to the point 17 only within the interval between the arrows 102. Outside that interval, the tracker would orient to some other zero phase line 100 which was nearer the optical axis point 24 than was the constant phase contour 100 upon which the point 17 was placed. It can be seen that the tracking interval between the arrows 102 is far larger for lower frequencies, due to their longer wavelength (FIG. 7a), while the graphic representation of FIG. 7 $b$ shows the narrowing capture interval resulting from shortening of the wavelength. Thus lower frequency phase components are preferred in the inventive system. In practice the selection of wavelengths that are large, exact sub-multiples of the fundamental frequency or of the aperture has been found to produce best results.

Figure 7C:
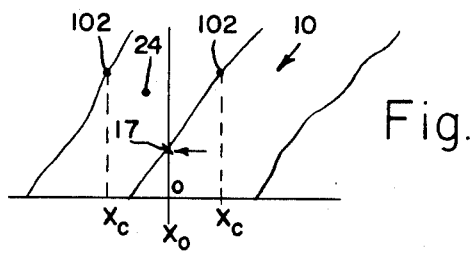
Figure 7D:
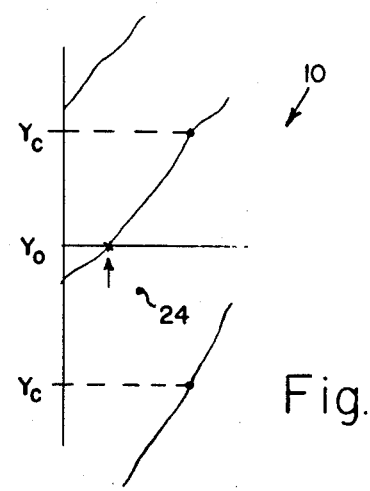

FIG. 7c and 7 $d$ illustrate the interaction between the $x$-$y$ coordinates of the point 17 and the phase coordinates. Although each of the constant phase lines 100 is not perfectly linear, it is near enough so that it can be said to have a slope. In particular, the angle $\alpha$ that the slope of the constant phase contour 100 makes with the x axis may be defined from $\Phi(x,y)$ by the relation $<\alpha = mb/na$. Proceeding from this relation, the $x$ coordinates and $y$ coordinates of the aim point 17, the optical axis point 24, or the capture points 102 may be calculated from their position on the constant phase contours 100.

The phase behavior for any point 24 within the capture interval 102 can best be represented by a displacement from the aim point 17. In such a situation the following approximation may be applied:

$$\Phi_{mn}(x,y) = \Phi_{mn}(0,0) + a_1X + b_1Y$$

$A_1$ and $B_1$ in the above formula are the partial derivatives of $\Phi_{mn}$ at the point (0,0) and have the following values:

$$a_1 = (2\pi m)/(\beta_{oz} + R_{a_1})$$

$$b_1 = (2\pi n)/(\theta_{oz} + R_{b_1})$$

where $m$ and $n$ are the number of cycles of field component across the aperture in the x and y directions, respectively, and where $\beta_o$ is the sensor (full angle) field of view, and where z is the slant range to the aim point 0,0. $R_{a_1}$ and $R_{a_1}$ will be constants for a given aim point 17, but will vary for different aim points on the same image. From these evaluations of $a_1$ and $b_1$ it can be seen that the phase of any point 24, relative to the point 17, can be expressed generally as:

$$\Phi_{mn}(x,y,\Delta z) - \Phi_{mn}(0,0,0) = a_1x + b_1y + c_1z$$

Phase tracking according to the principles of the instant invention is accomplished by the solution of the above equation for several different Fourier spatial frequency components. Thus, simultaneous equations can be written for a number of different field components having phases $\Phi_1, \Phi_2, \Phi_3$ as follows:

$$\Phi_1 - \Phi_{1,0} = A_1x + B_1y + C_1\Delta z$$
$$\Phi_2 - \Phi_{2,0} = A_2x + B_2y + C_2\Delta z$$
$$\Phi_3 - \Phi_{3,0} = A_3x + B_3y + C_3\Delta z$$

The notation above is simplified by letting $\Phi_1(x,y,\Delta z)$ be represented by a simple $\Phi_1$; while $\Phi_1(0,0,0)$ is represented by $\Phi_{1,0}$.

$A_1, A_2, A_3, B_1, B_2, B_3, C_1, C_2, C_3$ are stored partial derivatives to give variable gain capability to the servo loop by which tracking error is minimized.

The simultaneous equation above can be rewritten to solve for $x$, $y$, and $\Delta z$ in the following form:

$$x = h_1(\Phi_1 - \Phi_{1,0}) + g_1(\Phi_2 - \Phi_{2,0}) + k_1(\Phi_3 - \Phi_{3,0})$$
$$y = h_2(\Phi_1 - \Phi_{1,0}) + g_2(\Phi_2 - \Phi_{2,0}) + k_2(\Phi_3 - \Phi_{3,0})$$
$$\Delta z = h_3(\Phi_1 - \Phi_{1,0}) + g_3(\Phi_2 - \Phi_{2,0}) + k_2(\Phi_3 - \Phi_{3,0})$$

In the implementation of the above solution, applicant's phase tracking system stores pre-computed values of $\Phi_0$, $h$, $g$, and $k$ for the $x$, $y$, and $\Delta z$ lines of the simultaneous equation. In missile work, these values may be computed prior to the mission from reconnaisance photography, based upon the terminal trajectory to be followed. As long as a missile sensing unit 18 has its optical axis point 24 within the capture points 102, the information from the transducing and phase-extracting system 52 (FIG. 3) will be sufficient for the missile computing element 56 to provide signals indicating the x deviation and y deviation (see FIG. 7 c and d) of the optical axis point 24 from the aim point 17. The solution of three simultaneous equations will also provide a $\Delta z$ value, the importance of which will now be explained.

Figure 8:
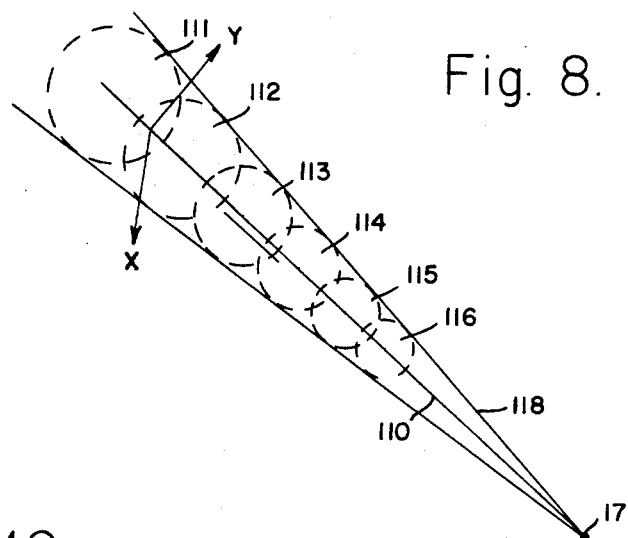
FIG. 8 illustrates the tracking cone of a missile in its terminal stage.

Referring to FIG. 8, the line of trajectory of a missile warhead to its aim point 17 is represented by the numeral 110. This line 110 represents the nominal or preselected trajectory of a warhead programmed to phase track in its terminal phase to the target point 17. As was stated above, the warhead is programmed by storing values of $\Phi_0$, $h$, $g$, and $k$ by which the $x$ and $y$ components of the error vector 26 can be continuously computed and servo control signals can be generated. Unfortunately, however, the stored values do not remain valid as the distance along the $z$ coordinate (i. e. the range between the warhead and the target point 17) decreases, because the total intensity within the sensor aperture may vary with great discontinuity as large light or dark objects suddenly pass beyond the aperture boundaries. Accordingly, it is necessary to define a number of parameter zones, here numbered 111 through 116, and to store fresh values of $\Phi_0$, $h$, $g$, and $k$ terms for each parameter zone. Thereafter, the missile computer switches from one set of parameters to another as the range z na-rows from one zone 111 through 116 to the next nearest zone, by calculating $\Delta z$ along with $x$ and $y$ in the course of solving the three simultaneous equations given above.

Referring back to FIG. 3, this is accomplished by extracting three Fourier spatial frequency components having distinct $m,n$ values from the video signal transduced from the incoming radiation 50. The transducer and phase extractor system 52 passes these three phase values to the computer 56, which solves the equations for $x$, $y$, and $\Delta z$. The $x$ and $y$ solutions computed at 56 are passed to the flight control system 60, while the $\Delta z$ solution is passed to the reference parameter store 58. The $x$ and $y$ values are used by the control system 60 to develop control signals which cause the missile servo system 54 to reduce the vector 26 to zero. The value $\Delta z$, on the other hand, serves to switch the parameter store 58 from one parameter 111 through 116 to the next closer parameter. By switching between parameter zones, it is meant that the parameter store is switched to supply values of $\Phi_0$, $h$, $g$, and $k$ terms for all three lines of the $x$, $y$, $\Delta z$ simultaneous equation to the computing element 56. Since a different set of terms is stored for each parameter 111 through 116, this switching between parameters involves switching from one set of stored values to another.

The above description sets forth principles of phase terminal guidance tracking which avoid the errors inherent in prior art maximum tracking. It should be noted that the simultaneous equation in $x$, $y$, and $\Delta z$ enables the computer 56 to compensate directly for changes in slant range; and this is accomplished without the use of an external range sensor as was heretofore necessary. Moreover, the external range sensors such as radar that have been used up to the present time have not been capable of the accuracy that is achieved by a system deriving slant range from phase information.

Referring again to FIG. 8, the lines 118 drawn tangent to the parameter zones and converging at the aim point 17 define a cone which will be referred to herein as the tracking cone. To perform accurate terminal guidance within the capture points 102, a warhead must be within this tracking cone. However, at the beginning of the terminal dive of most present missiles, the missile is neither positioned, nor oriented within the tracking cone 118, due to the inaccuracy of the inexpensive inertial guidance systems used in the mid-phase guidance of the missile. Accordingly, another feature of the applicant's invention is the use of Fourier spatial frequency phase analysis of the electrical signals produced for the sensor 18 to perform the acquisition task whereby the missile can be guided into the terminal guidance or tracking cone.

Figure 9:
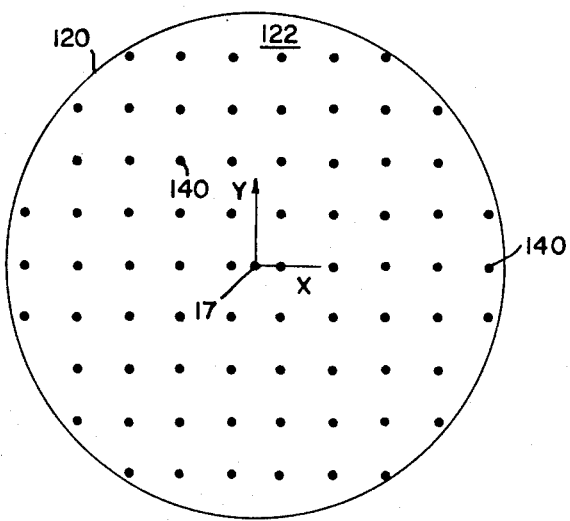
FIG. 9 shows an aperture and reference grid for performing target acquisition according to the principles of this invention.

Referring to FIG. 9, the circular line 120 defines an acquisition area 122 which the inertial or other midphase guidance system of a missile can achieve with a high degree of probability. A square having sides 124 and 126 centered about the optical axis point 24 indicates the tracking capture area which would fall within the arrows 102 in FIG. 7. It can be seen that the tracking capture area will very likely not include the aim point 17 for random locations of the optical axis point 24 within the area 122.

Even worse, the entire field of view 130 of the sensor 18, defined by a square having sides 132, will rarely include the aim point 17. In such a situation, the solution of the simultaneous equation in $x$, $y$, and $\Delta z$ as discussed above will not provide useful information. Thus, the acquisition principles of the instant invention relate to reducing the vector 26 between the aim point 17 and the optical axis point 24 to a small enough amount that the aim point 17 is brought within the square 124 – 126, which is the same as saying that the sensor 18 has been positioned within the tracking cone 118. According to the invention, the sensor 18 is oriented such that the square 124 – 126 covers the aim point 17 by locating the aim point with sufficient precision so that the missile can make corrective maneuvers at the beginning of its terminal phase. These corrective maneuvers bring the optical axis 20 of the sensor 18 within the tracking cone 118, which is to say that the sensor 18 must be translated into the tracking cone and oriented into the tracking capture area 124 – 126. This function is performed, according to the instant invention, using the same sensor 18 and Fourier spatial frequency analysis phase information that was described in connection with the terminal tracking process.

To carry out the acquisition process, the optical axis 20 of the sensor 18 will be directed, subject to midcourse attitude errors, to an orientation parallel to the nominal trajectory shown at 110 of FIG. 8. In addition, the nominal z component (i. e. slant range) is selected and nominal pitch, yaw, and roll conditions are assumed. In practice, an incoming missile would be controlled to approximate these selected nominal values.

For the nominal range and orientation of the missile selected for performing acquisition, acquisition reference phase data is stored at 58. This phase data is of a different nature than the $h$, $g$, and $k$ parameters discussed in connection with terminal tracking, although the location of the aim point 17 still figures as the paramount criterion.

Figure 10A:
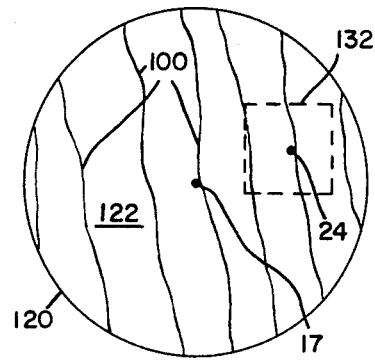
FIGS. 10a and 10b show the arrangement of constant phase contours within the aperture of FIG. 9.
Figure 10B:
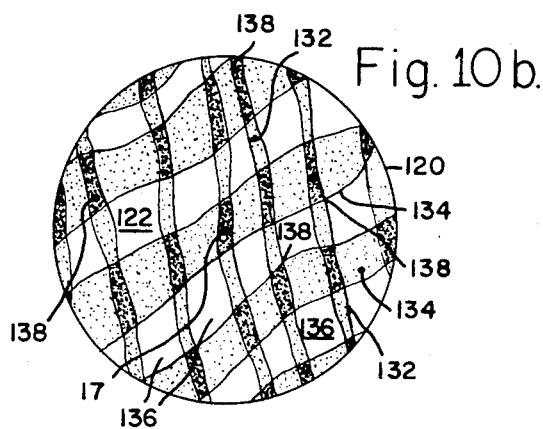

Referring to FIG. 10, the acquisition area 122 is shown in FIG. 10 a with the constant phase contours 100 discussed above drawn in. Obviously, the aim point 17 is not within the capture interval of the optical axis point 24, and the fact that the aim point 17 and the optical axis 24 are both fairly near to the zero phase contours 100 is no indication that they are both near to the same contour or where they are located along that contour.

FIG. 10 b shows the acquisition area 122 redrawn with two constant phase contours passing therethrough. In FIG. 10 b these contours are drawn as shaded areas rather than as lines, because in practice they are not as accurate as would be implied by a linear representation. However, even with a broad leeway for error, it can be seen that when the aim point 17 and the optical axis 24 are located at the intersection points of the constant phase contours of two different Fourier spatial frequency components, here numbered 132 and 134, some idea of their location can be gained. They could not appear in any of the white areas 136, but they could be located in any one of a number of the intersections 138. Thus, a Fourier analysis both of image data to determine the aim point 17 and of incoming radiation 50 to determine the optical axis 24 using only two components 132 and 134 would produce only ambiguous information as to the location of any point being sought.

According to the acquisition principles of this invention, the number of constant phase contours such as 132 and 134 representing different $m,n$ values of the intensity equation $I(x,y)$ is increased to the point where the statistical probability of ambiguity is left very small. As additional field components are added to the grid shown in FIG. 10 b, the probability that a point not in the immediate vicinity of the optical axis 24 will be overlapped by all the component bands which overlap the optical axis becomes very small; for field component phases at points significantly displaced from the optical axis are effectively random. Thus, if the phase indeterminacy $\pm \Delta \Phi$ is the same for all bands, the false match probability of a point not in the vicinity of the optical axis 24 being overlapped by Nf bands if $P=[(\Delta \Phi)/180]N_f$ with $\Delta\Phi$ expressed in degrees. This probability becomes very small as $Nf$ increases, even if $\Delta\Phi = 30°$ and $N=8$, the probability would be $6.0 = 10^{-7}$. This would mean that the false match probability if eight Fourier spatial frequency phase components were used in performing image analysis for the acquisition operation would be better than one in a million.

FIG. 9 also shows the principles of the instant invention whereby the use of intersecting constant phase contours for acquisition is implemented. A reconnaisance photo of the area around the aim point 17 is used to extract storage information for the acquisition tracking phase by defining throughout the acquisition area 122 a grid of points 120. Each point 140 represents a specific point on the reconnaisance photo to be analyzed for its light intensity characteristics and, more particularly, to be Fourier-analyzed to derive the phase information necessary for drawing the constant phase contours illustrated in FIG. 10. The storage portion 58 of the tracker electronics in a system according to the instant invention would have $Nf$ items of phase information stored for every grid storage point 140.

Thus, if it were decided to achieve the accuracy provided by using eight Fourier spatial frequency field components in the acquisition process, eight phase values would be stored at each grid storing point 140. The total amount of phase information stored would then be $Nf\, Ng$, $Ng$ representing the number of grids selected within the area 122. Along with the phase information stored at each point 140, these would ordinarily be location or identity information, by which the point 140 is uniquely identified and pin-pointed within the area 122.

Given the grid of stored phase information shown in FIG. 9, acquisition according to the instant invention is accomplished as follows: first the sensor 18 obtains a video signal, from which $Nf$ Fourier spatial frequencies are separated out. The phase of each frequency so separated out is then determined. Thereafter, the acquisition logical electronics searches through the grid points 140 until a match is found between the Nf phase values stored at some point 140 and the $Nf$ phase values sensed for the optical axis point 24. Since the optical axis point 24 may not coincide directly with any grid storage point 140, the computer 56 also performs an interpolation from the nearest point 140, using the phases of 2 or so of the $Nf$ field components much in the manner described in connection with tracking above. The result is that the computer 56 supplies identity, or more particularly location coordinates, of the match point 140 plus interpolation corrections to approximate the optical axis point 24 as close as possible. These coordinates are used to calculate the vector 26, which is then zeroed by the control signals to the servo system 54.

Although prior-art acquisition using photographs has been so complex and error-ridden as to be impossible, Fourier spatial frequency phase analysis acquisition has been found very precise and reliable. Moreover, the acquisition probability is not affected by the type of image being sensed. For example, in actual experiments identical probabilities were obtained using Ranger lunar photographs and using reconnaisance aircraft photography. To a certain degree any difficulty that might arise due to large variations in altitude or other extreme image conditions can be eliminated by eliminating any phase contours that are badly affected thereby. Thus, phase analysis of the reconnaisance of photography makes it possible to work around the error-producing conditions that are so detrimental to prior-art maximum trackers, mainly because the discontinuities in various Fourier components do not occur at the same image point for any one component. Consequently, it is very simple to eliminate in the preprocessing of reconnaisance photographs to derive the phase information for each grid storage point 140 to eliminate any Fourier spatial frequency components that have undesirable behavior in the acquisition area 122.

Figure 11:
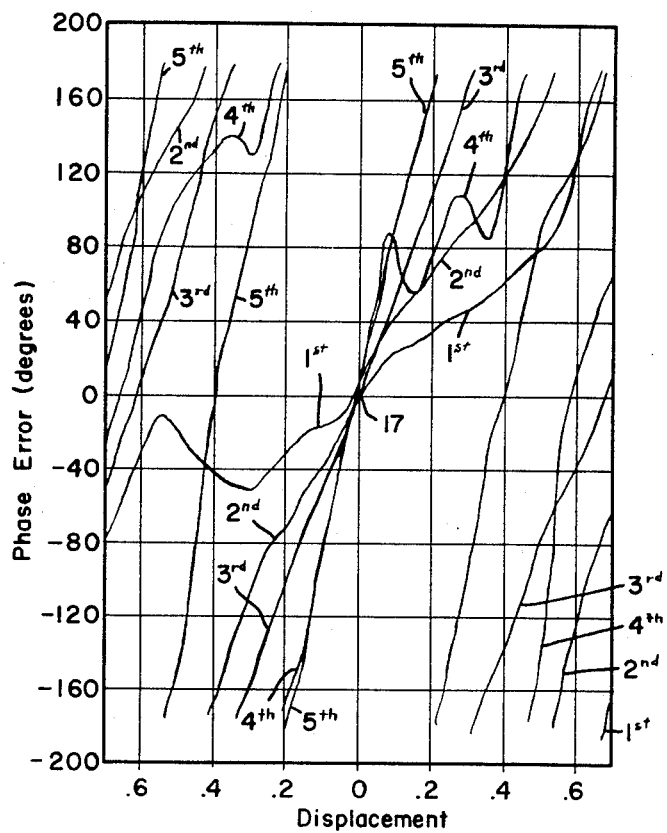
FIG. 11 is a graph of phase error versus displacement for a number of correlation components.

As an example of the elimination of undesirable Fourier spatial frequency components in analyzing reconnaisance photography, FIG. 11 graphs phase-error in degrees as a function of displacement from the zero point 17 for the first through fifth harmonics of the intensity function of a certain reconnaisance photograph. It should be noted that all the harmonics from the first through the fifth pass through the aim point 17, indicating zero relative phase differences at the match point.

Calling attention particularly to the fourth harmonic, it should be noted that this harmonic engages in some erratic changes and shifts in direction near the zero point 17. This is because the fourth harmonic is very small in magnitude and therefore very susceptible to all sorts of perturbations. The fourth harmonic has the additional defect that it shifts very markedly when the image sensor 18 is not precisely in the plane of one of the parameter zones referred to in FIG. 8 above. For this reason, the fourth harmonic is simply eliminated from consideration in tracking and acquisition performed according to this invention. Whereas all prior art methods were unable to eliminate such error-introducing components, the Fourier analysis concept taught herein makes it quite simple to strike out any such component such as the fourth harmonic of FIG. 11 which causes undue difficulty.

FIG. 12 illustrates the one-dimensional analysis embodiment of the invention, wherein an aperture 200 is moved substantially in one direction, such as along the $x$ axis 202 or $y$ axis 204. Where a vidicon camera is used as the sensor 18, its standard TV scan raster would be sufficient for one-dimensional Fourier phase analysis as taught herein. The aperture 200 has a fixed width of $2a$ and a fixed height of $2b$. When it is moved across an image 206 in a direction substantially parallel to its height dimension (i. e. the $y$ axis) or its width dimension (i. e. the $x$ axis), any variation of the light intensity function $I(x,y)$ will be with either x or y constant, so that the function will reduce to $I(y)$ or $I(x)$.

FIG. 12 (b) shows motion of the aperture 200 in the $x$ direction, producing the undimensional intensity function $I(x)$. If the aperture 200 were moved from $x$ to $x_2$ or oscillated between $x$ and $x_2$ the function $I(x)$ would have a variable component which could be Fourier analyzed.

FIG. 12 $c$ shows twin scan rasters through which two sensor 18 might transduce light to produce electrical signals $I(x)$ representative of an actual image 210 and a reference image 212. One raster of scan is mathematically almost the equivalent of a straight line of scan in the $x$ direction, while repetition of the raster is the equivalent of recycling the sensor 18 to sense the same straight line again. If the actual image 210 and the reference image 212 are scanned in synchronism along identical paths 214, producing intensity signals $Ia(x)$ and $Ir(x)$ [or $Ia(t)$ and $Ir(t)$, since $x$ and $t$ are interdependent], then correlation of Fourier component phases [in terms of position $(x)$ or time delay $(t)$] can be performed as taught above.

Figure 13:
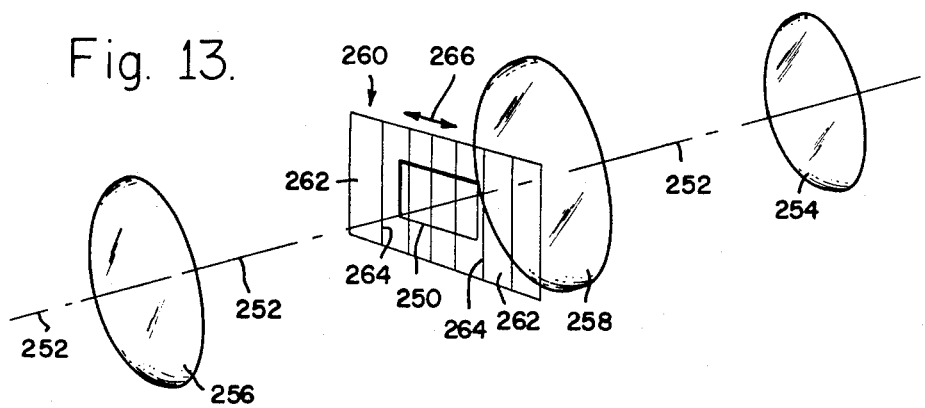
FIG. 13 is a schematic of an optical system with oscillating reticle.
Figure 12A:
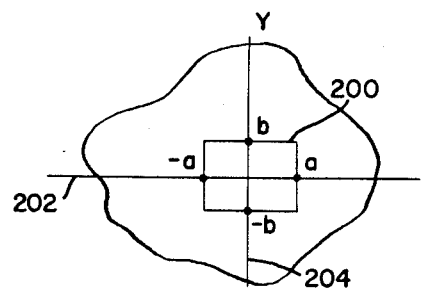
FIGS. 12a, 12b, 12c and 12d illustrate the principles of one-dimensional phase analysis according to this invention.
Figure 12B:
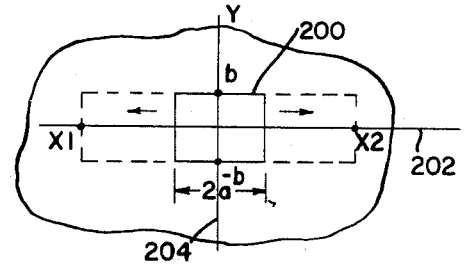
Figure 12C:
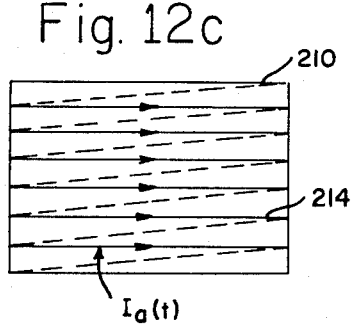
Figure 12D:
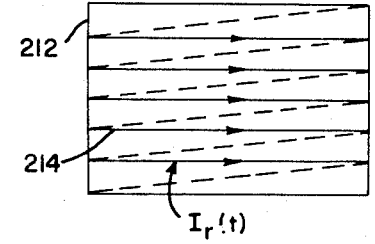
Figure 14:
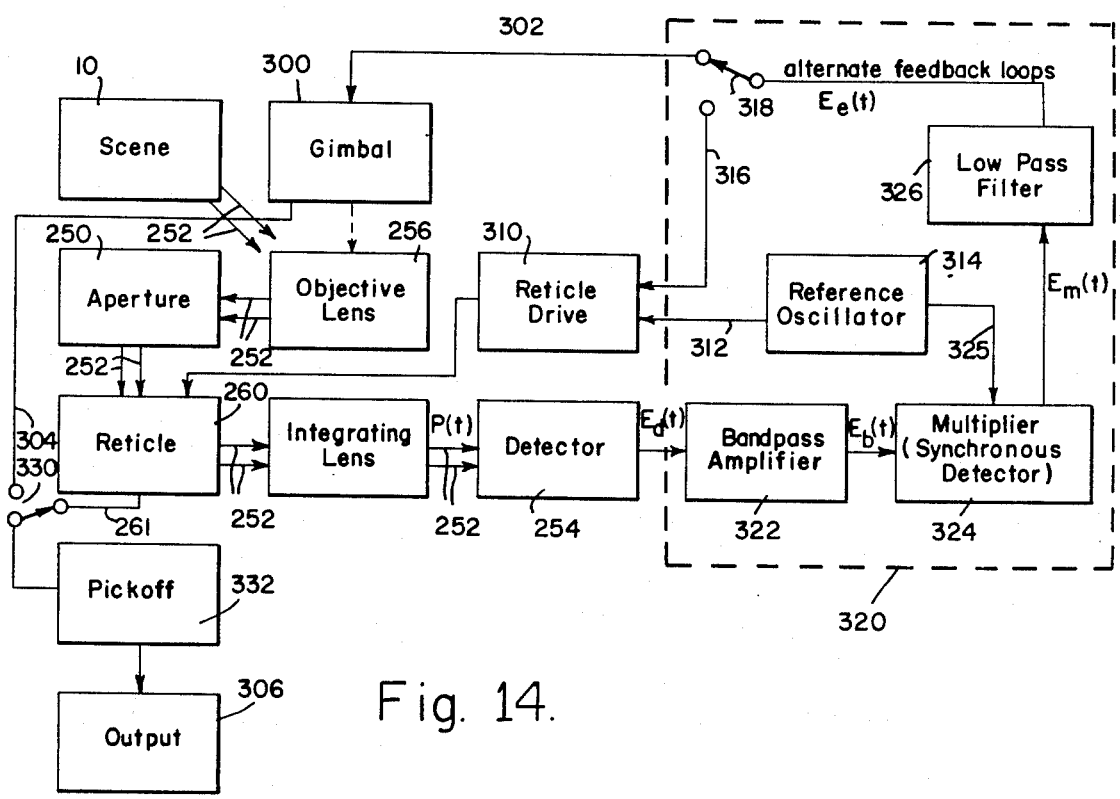
FIG. 14 is a block diagram of a tracking system using the oscillating reticle of FIG. 13.

FIGS. 13 and 14 illustrate an optical system and its associated electronics and other equipment for performing tracking or other image correlation or analysis using only one Fourier frequency component. The optical system of FIG. 13 has an aperture 250 through which radiation 252 passes to reach some form of photo-detector 254, such as a solar cell or photomultiplier. An objective lens 256 focuses incoming radiation 254 to form an image in the plane of the aperture 250. An integrating lens 258 directs all the radiation 252 passing through the aperture 250 on to the photo-detector 254.

As a feature of the invention, a movable reticle 260 is placed in optical series with the aperture 250. The reticle 260 may be constructed as shown in FIG. 13 by having alternate transparent portions 262 and opaque portions 264; on the other hand, the transition from transparent to opaque could be shaded in sinusoidal or other relation. An arrow 266 indicates the direction of motion of the reticle 260; the effect of such reticle motion is to cause the transmission of light through the aperture 250 to vary as a function of time in the horizontal plane while remaining invariable in the vertical plane. Naturally, the principles of the reticle 260 could be implemented as well if the opaque bars 264 were horizontal rather than vertical or were radial about a point of rotation or varied in some other pattern. Similarly, the motion along the direction of the arrow 266 would preferably be sinusoidal, but the reticle principle can be applied with other time functions of motion that are more convenient and simple to achieve mechanically. For the discussion to follow, however, the reticle 260 will be discussed in terms of its configuration as shown in FIG. 13 and in terms of sinusoidal motion along the direction of the arrow 266.

Thus, the optical system of FIG. 13 features the use of the reticle 260 placed in motion along the direction 266 to provide a sinusoidally varying transmission in one dimension and constant transmission in the other dimension. The opaque bars 264 are aligned precisely with the edges of the aperture, and the frequency of the cycle of motion of the reticle 260 is a multiple of the aperture frequency; so that an integral number of cycles are contained within the aperture 250. The result is that the only spatial frequency of the image being surveyed by the optical system that is passed through the aperture 250 is the spatial frequency corresponding to the reticle frequency. In this manner, the optical system of FIG. 13 performs a mechanical filtering which ensures that only one spatial frequency is passed to the photo-detector 254.

The light energy 252 reaching the photo-detector 254 is converted into electrical energy which varies with time to produce an A. M. electrical signal having as a fundamental frequency the frequency of oscillation of the reticle 260. Higher harmonics of the "dither" frequency are also present, but these are filtered out or are otherwise eliminated by the circuitry processing the signals produced by the photo-detector 254.

In order to detect the zero phase point of the image from which the light 252 is gathered, the electrical signal from the detector 254 is used as an error signal to drive the average reticle position (i. e. the mean point or center point of reticle operation) into coincidence with the image zero phase point. An alternative technique for locating the zero phase point is to rotate the tracker itself until a zero phase reading is produced, and then sense the gimbal angle or angle of rotation at which zero phase occurs.

In an actual optical system built according to the principles illustrated in FIG. 13, the objective lens 256 was an $f/2.8$ camera lens having a 50 mm focal length. The dimensions of the aperture 250 were 4 mm by 4 mm and the reticle wavelength was 0.55 mm. Thus, the reticle 260 interacted with the aperture 250 to cause the tracker using the optics of FIG. 13 to analyze the seventh harmonic of the aperture 250. The reticle 260 was a negative transparency obtained by photographing a sinusoidal pattern display. The average transmission was 12 percent and the modulation was 67 percent. The edges of the aperture 250 were adjustable to allow trimming for zero aperture signal. The lens 258 was a 1 inch $f/1$ single element lens, the conjugate planes of which were at the exit pupil point of the objective lens and the plane of the photo-detector 254. Thus, energy falling on the photo-detector 254 was diffused and any modulation effects due to a shifting energy pattern upon the photo-detector 254 were eliminated.

The photo-detector 254 itself was a two centimeter silicon solar cell operating in the photo voltaic mode. This large size cell was chosen to eliminate the need for an extremely fast integrating lens at 258. Its gain was four volts/lumen for 2,700°K illumination.

FIG. 14 illustrates in block form an experimental tracking system in which the reticle optics of FIG. 13 might be employed. The light rays 252 originate at a scene 10 and pass through the objective lens 256, the aperture 250, the reticle 260, and the integrating lens 258 to the detector 254. The objective lens 256 (and usually the rest of the optics as well) is mounted upon a gimbal system 300 which may be positioned by an integral servomechanism according to electrical signals entering on a line 302. The gimbal system 300 produces position signals on a line 304, which signals may serve as the basis for producing a system output signal at 306.

The reticle 260 is oscillated by a reticle drive system 310 (i. e. a reticle servomechanism), derived from reference signals arriving on a line 312 from a reference oscillator 314. The center of oscillation of the reticle 260 is variably determined by a feedback signal arriving on a line 316.

The system feedback loop (enclosed in dotted lines 320) utilizes the electrical signal $E_d(t)$ produced by the optical-electrical transducer 254 to produce either a gimbal control signal at 302 or a reticle centering signal at 316, depending upon the setting of a switch 318. In either case, the feedback signal is derived from $E_d(t)$ by amplification and narrow-band filtering at 322, to filter out all frequencies save that originating from the oscillator 314. This pure sinewave $E_b(t)$ is then fed to a synchronous detector 324 which also uses the oscillator 314 as a reference source (line 325). The synchronous detector 324 effectively multiplies $E_b(t)$ and the reference signal from 325 to produce $E_m(t)$, a signal which will vary with the phase of the scene 10. Filtering at 326 produces the proper form of error signal $E_e(t)$ for the gimbal 300 or reticle drive 310, so that one or the other "zeroes" the phase sensed at 324.

As stated above, the gimbal system 300 produces an output electrical signal on the line 304 to indicate gimbal position. Likewise, the reticle 260 produces a signal on the line 261 to indicate center of reticle oscillation. A switch 330 may choose between the lines 304 and 261 to couple one such signal into a pickoff 332 which derives therefrom a signal for the output 306 discussed above. Naturally, the switch 330 should use the output indication from the same source 300 or 260 that the feedback loop 320 is zeroing.

Figure 15:
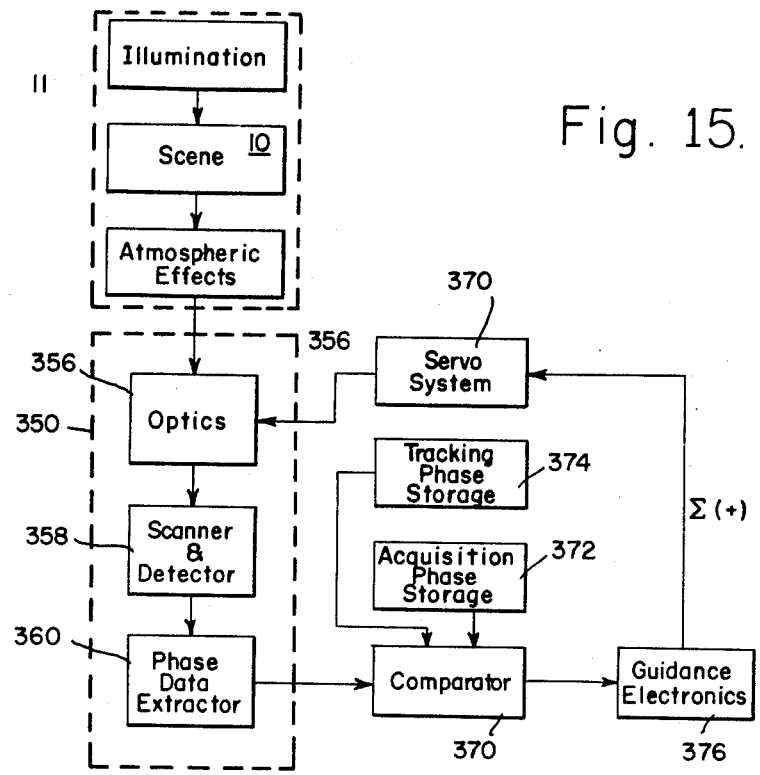
FIG. 15 is a block diagram of an advanced tracking system according to the invention.

FIG. 15 shows in block form an operational guidance system summarizing many of the principles discussed above in which the tracking system of FIG. 14 would appear, mainly within the dotted block. The dotted lines 11 surround the various factors which contribute to the image sensed by a tracking system in missile guidance work; for a given scene 10 "looks" different to a tracker at various angles and intensities of illumination (block 352) and through varying clouds and the like (block 354). Light from the total source 11 passes through an optical train 356 to reach a detector 358 such as a silicon cell, camera, vidicon or orthacon or some other optical-electrical transducer. The electrical signals from 358 are processed at 360 by electrical circuitry designed to extract the phase of source 11.

The phase information from 350 is fed to a comparator 370, which produces a location vector signal $L(t)$ using the phase information and stored values either from 372 during acquisition or from 374 during tracking. $L(t)$ is applied to guidance electronics at 376 to produce an error-control signal $E(t)$ for the missile servo system 378, which controls the attitude and path of the missile and thus of the optics 356 therein.

Thus, applicant has achieved improved principles of image correlation which avoid the error sources (esp. random D. C. variation and erratic harmonics) of prior "maximum" correlators, not only by analyzing separate Fourier components of the electrical intensity function, $I(x,y)$ or $I(x)$ or $I(t)$, but also by analyzing in terms of phase rather than mere signal intensity. The various implementations of this Fourier-phase image analysis principle that are disclosed herein are also novel, but the scope of the invention is not limited to any one or all of them.

A number of alternative arrangements will readily suggest themselves to those skilled in the art. However, although the invention has been described with a certain degree of particularity, it is to be understood that the present disclosure has been made only by way of example as that numerous changes in the details of construction and the combination and arrangement of parts may be resorted to without departing from the spirit and the scope of the invention as hereinafter claimed.

Applicant claims as his invention:

1. A method of analyzing the content of an image, including:

separating said image into small segments which taken together constitute said image;

quantifying the light intensities of each separate constituent small segment of said image;

expressing the quantifications of the light intensities of the separate constituent small segments of said image in electrical signals having amplitudes which are a function of said light intensity of each separate constituent small segment of said images;

formulating a system of standard components from which any electrical signal can be constituted;

identifying all of said standard components which in total constitute each said electrical signal; and converting the identity of each said electrical signal as identified from the standard components it contains into a representation identifying said image.

2. The method according to claim 1 wherein the step of separating said image into small segments includes scanning said image in small segments by scanning and then periodically interrupting the scanning process, and the step of formulating standard components includes the Fourier analysis of said electrical signals.

3. A system for locating points on an image, including;

an optical sensor for receiving radiation from an image and developing an electrical signal representative of said image;

first means electrically connected to said optical sensor for analyzing said electrical signal into its Fourier components;

second means electrically connected to said first means for separating out at least three of said Fourier components for isolated analysis without reference to any other of said Fourier components;

third means electrically connected to said second means for sensing the phase of each Fourier component separated out by said second means;

fourth means for storing sets of reference phase characteristics of the same frequencies of Fourier components separated out by said second means at points to be located by said system; and computing means electrically connected to said third means and to said fourth means for relating the location of images sensed by said optical sensor to the location of said points to be located by said system, said optical system scans said image at certain scan frequencies and said second means separates out Fourier components having frequencies that are integral multiples of said scan frequencies, the highest frequency of Fourier component separated out by said second means is small relative to said scan frequencies, said optical sensor has an optical axis and said computing means derives a sensor location signal by identifying the point on an image which is coincident with said optical axis, said computing means locates points in terms of the constant phase contours passing through said points, the fourth means registers as Fourier component phase characteristics of said points to be located the constant phase contours intersecting at each said point to be located, the optical sensor is moved by a servo system such that its optical axis passes from point to point on said image; and the computing means is electrically connected to the servo system and supplies control signals to the servo system to cause the servo system to alter the position of the optical sensor to bring the optical axis into coincidence with each said point to be located.

4. The system of claim 3 wherein the first and second means are analog devices and the fourth means and the computing means are digital devices.

5. The system of claim 3 wherein said computing means also provides an electrical signal indicative of the slant range from each point for which a location signal is supplied.

6. The system of claim 5 wherein the computing means is electrically connected to pass said electrical signals indicative of slant range back to said fourth means; and said fourth means supplies varying values of phase characteristics corresponding to the slant range information received by it from the computing means.

7. The system of claim 3 wherein said computing means derives a signal approximating the orientation of said optical axis by expressing the location of said optical axis relative to a point to be located in terms of the location of said point to be located plus a certain vector sum by which the point at said optical axis intersects the plane of said image is displaced from said point to be located, said vector is expressed in terms of its components along an ordinate and an abscissa and the difference in phase between said point to be located and said point at which said optical axis intersects the plane of said image is derived by multiplying said vector components by partial derivatives of the constant phase contours of the Fourier components separated out by said second means, and said partial derivatives are stored by said fourth means and are the partial derivatives of the constant phase contours taken at the point to be located.

8. The system of claim 7 with the additions that said optical sensor is positioned by a servo system;

said servo system is electrically connected to receive control signals from said computer means;

said computing means derives control signals for said servo system from said vector sum components, and with the additional specification that said control signals supplied by said computing means control said servo system in such manner that said vector sum components are made to approach zero.

9. The system according to claim 3 with the additions that said optical sensor has an aperture having certain dimensions and that the wavelengths of said Fourier components separated out by said second means are exact sub-multiples of one of said aperture dimensions, said wavelengths of said Fourier components are the lowest possible exact sub-multiples of one of said aperture dimensions consistent with having each wavelength different from the others.

10. The system according to claim 9 wherein the highest Fourier frequency does not exceed one half the number of image elements on a side of the said aperture.

11. A system for determining location relative to an image including:

an optical-electrical transducer for receiving radiation from the image and deriving from said signal representative of said image an image forming constant phase contour, said optical-electrical transducer having as a reference axis indicative of the orientation of said optical-electrical transducer;

first means for extracting a plurality of Fourier components from said electrical output signal;

second means for storing selected values of said Fourier components at a number of points in said image forming constant phase contours, the number of constant phase contours stored exceeds five, and with the addition that said optical-electrical transducer scans said image at certain scan frequencies and said first means separates out Fourier components having frequencies that are integral multiples of said scan frequencies.

12. The system of claim 11 with the additions that said optical-electrical transducer is positioned by a servo system to vary the orientation of its reference axis;

said servo system is electrically connected to receive control signals from said third means; and said third means derives control signals for said servo system from said electrical signal.

13. The system according to claim 11 with the additions that said optical-electrical transducer has an aperture for receiving radiation having certain dimensions and that the wavelengths of said Fourier components separated out by said second means are exact sub-multiples of one of said aperture dimensions, said wavelengths of said Fourier components are the lowest possible exact sub-multiples of one of said aperture dimensions consistent with having each constant phase contour different from all the other constant phase contours.

14. The system of claim 11 wherein the second means registers as Fourier component phase characteristics of said points the Fourier spatial frequency constant phase contours intersecting at each said point, the optical-electrical transducer is moved by a servo system such that its reference axis passes from point to point on said image;

third means electrically connected to the servo system and supplies control signals to the servo system to cause the servo system to alter the position of the optical-electrical transducer to bring the reference axis into coincidence with said point to be located, the third means also provides an electrical signal indicative of the slant range from each point for which a location signal is supplied, said third means derives a signal approximating the orientation of said reference axis by expressing the location of the reference axis relative to a reference point on the image in terms of the location of said reference point plus a certain vector sum by which the point at which reference axis intersects said image is displaced from said reference point, wherein said vector sum is expressed in terms of its components along an ordinate and an abscissa and the difference in phase between said reference point and said point at which said reference axis intersects the plane of said image is derived by multiplying said vector components by partial derivatives of the constant phase contours of the Fourier components separated out by said second means.

15. The system according to claim 14 with the additional specification that said control signals supplied by said third means control said servo system in such manner that said vector sum components are made to approach zero.

16. A method of analyzing the characteristics of images when viewed from different angles, comprising:

scanning an image from a first angle through a first aperture having a certain height and a certain width;

transducing radiation from said image passing through said first aperture into first electrical signals representative of the intensity of said radiation;

scanning said image through a second aperture at a second angle not identical to said first angle, said second aperture being substantially identical to said first aperture;

transducing radiation passing through said second aperture into second electrical signals representative of the intensity of said radiation;

separating out selected identical frequencies of Fourier components from said first electrical signal and said second electrical signal;

plotting for selected points throughout said image the difference in phase at each said selected point between identical frequencies of Fourier components of said first electrical signal and said second electrical signal.

17. The method of claim 16 wherein the step of scanning is performed using a scan pattern and the scan pattern is altered to ascertain the change in phase ascertained in the plotting step.

18. In combination, first means for optically sensing a certain area and converting the radiation from said area into first electrical signals; said radiation for the optical sensor passes through an aperture and a transmission reticle is positioned in optical series with the aperture, and wherein the aperture is rectangular and has two orthogonal dimensions and the reticle has properties of constantly transmitting light in the direction of a first of said orthogonal dimensions and of transmitting light according to a sinusoidal formula along a second of said orthogonal dimensions, said reticle oscillates at a frequency that is an integral multiple of the frequency of said aperture, and wherein a photo-multiplier tube performs optical-electrical conversion on radiation from said image passing through said reticle, second means for separating out and isolating from said first electrical signals at least one Fourier component thereof;

third means for sensing the phase of said Fourier components separated out and isolated by said second means from said first electrical signals;

reference means for providing reference electrical signals representative of a reference area; and fourth means for developing second electrical signals from the reference signals and the phase sensed by said third means, said second electrical signals having the characteristic of indicating the distance between said reference area and said area optically sensed by said first means.

19. The system according to claim 18 wherein said reticle oscillates over a distance not exceeding the wavelength of its frequency of oscillation, and a photo-detector in optical series with said reticle and said aperture;

a synchronous detector electrically connected to said photo-detector;

means electrically connected to said synchronous detector for determining the phase of the signal from said synchronous detector, the reticle is oscillated by a servomechanism and the signal from the synchronous detector is fed back to the servomechanism to cause the center of reticle oscillation to be shifted into coincidence with the zero phase point of the image.

* * * * *